May 30, 1961 A. E. MARTIN 2,986,633
INFRA-RED ANALYSING APPARATUS
Filed Nov. 13, 1957
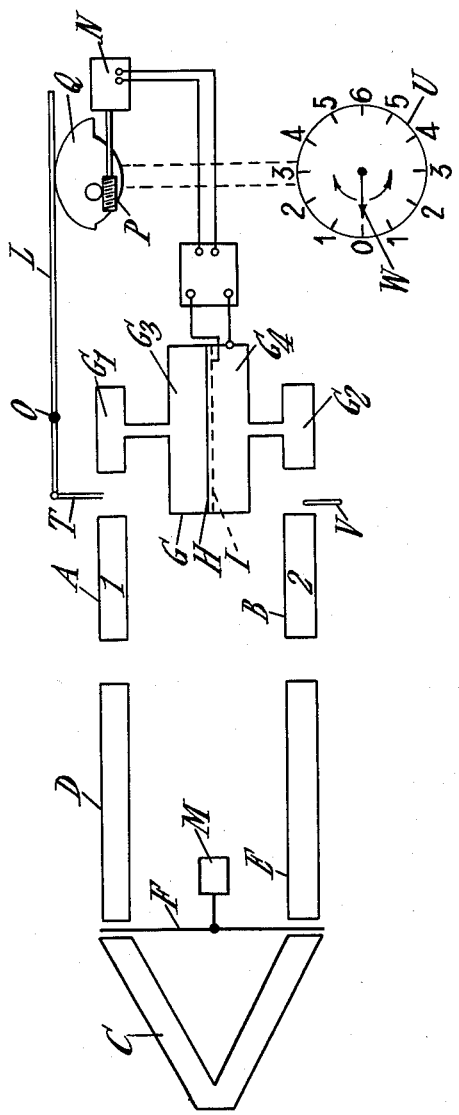

United States Patent Office 2,986,633
Patented May 30, 1961

2,986,633
INFRA-RED ANALYSING APPARATUS
Albert E. Martin, Newcastle-upon-Tyne, England, assignor to Sir Howard Grubb Parsons & Company Limited, Newcastle, England
Filed Nov. 13, 1957, Ser. No. 696,106
Claims priority, application Great Britain Nov. 14, 1956
2 Claims. (Cl. 250—43.5)

This invention relates to infra-red analysing apparatus of the kind described in co-pending application No. 575,657/56 wherein provision is made for the analysis of two components in a gas mixture without the need for altering the instrument when changing over from the analysis of one component to the other.

In brief the analyser comprises two paths for infra-red radiation, absorption tubes in each path and a detector having a receiving chamber in each path, each receiving chamber being in communication with a chamber incorporating a detecting condenser, the latter chamber being subdivided into two subsidiary chambers by a diaphragm adjacent to a fixed electrode.

In one of the forms of the instrument described, the absorption tubes in each path comprised a sample tube and a filter tube. If the two components of a gas mixture be designated 1 and 2, one filter tube was filled with gas 1 whilst the filter tube in the other path was filled with gas 2, and the receiving chambers of the detector were filled with a mixture of components 1 and 2. To analyse for component 1 sample gas was passed into the path in which the filter tube containing gas 2 was located, whilst a non-absorbing gas was passed into the sample tube in the other path. Conversely to analyse for gas 2 the sample gas was placed in the path containing the filter housing gas 1.

It is often convenient to adopt the null-balance principle in such instruments, that is to say, any difference in energy received by the detector from the two beam paths is used to produce an electric signal and this signal after amplification is used to operate a servo system moving an attenuator into or out of one of the beam paths until the energy balance is restored, when the position of the attenuator is used to give an indication of the quantity of the component of interest present.

The main object of the present invention is to provide an infra-red analyser of the kind described in co-pending application No. 575,657/56 which works on the null-balance principle.

The invention consists in an infra-red analysing apparatus for the analysis of two components of a gas mixture which apparatus comprises two separate absorption paths for infra-red radiation with a sample tube in each path, the sample tube in one path containing the gas mixture under test and the sample tube in the other path containing a gas which does not absorb infra-red radiation in the range of wavelengths absorbed by the gas mixture, and detection means having means in one path sensitive to one component gas to be detected and means in the other path sensitive to the other component gas to be detected, the arrangement being such that when sample gas is introduced into on path an electrical signal is produced as a result of the difference in radiant energy falling on detection means which signal is a function of the quantity of one component present, whilst when the sample gas is introduced into the other path an electrical signal opposite in sense to the first said signal is produced, said second signal being a function of the quantity present in the sample of the other component, said electrical signals being used to drive servo mechanism which actuates a shutter which moves in and out of a radiation path until the radiations entering the detection means from each path are equalised, the position assumed in said servo mechanism being communicated to a recorder which indicates the quantity present in the mixture of one or other of the two components by having two scales one for recording the presence of one component whilst the other scale records the presence of the other component.

The invention also consists in an infra-red analysing apparatus as set forth in the preceding paragraph wherein said servo mechanism comprises an electric motor which drives a cam, said cam operating said shutter through a lever arm.

In carrying the invention into effect in one form illustrated by way of example in the drawing, a gas analyser comprises a source of infra-red radiation S, a beam splitter C which divides the radiation into two paths directing it into absorption tubes D and E, a rotary shutter F driven by a synchronous motor M which shutter admits radiation simultaneously to the two absorption tubes a fixed number of times a second, and a detector G.

The detector comprises two receiving chambers $G_1$ and $G_2$, one in each radiation path. These receiving chambers are in direct communication with chambers $G_3$, $G_4$ respectively of a detecting condenser in which the two chambers $G_3$ and $G_4$ are substantially but not completely sealed from one another by a diaphragm H adjacent to a fixed electrode I.

In operation the chambers $G_1$, $G_2$, $G_3$ and $G_4$ are filled with a mixture of two component gases to be detected. Alternatively the chambers may be filled with a gas or mixture of gases with regions of absorption overlapping the absorption bands of the separate components to be determined.

A gas filter is provided in association with the detector in each absorption path, the filter tube A in one path for containing one component gas which we shall designate 1 and the filter tube B in the other path for containing the other component to be detected which we shall designate 2. The filter tubes A and B are shown situated between the absorption tubes and the detector; they may, however, be placed between the radiation source and absorption tubes if desired.

An optical attenuator T is provided in one path, movement of which is controlled by a cam Q driven through a worm gear P from motor N. The motor N is driven by an amplified electric signal produced by the detector G as a result of any difference in energy in the beam paths. The movement of the cam Q is transmitted to the attenuator T by means of a lever arm L pivoted at O.

When the tubes D and E contain a non-absorbing gas radiation will pass through tube D and some will be absorbed by gas 1 in filter tube A. Of the radiations entering the detector some will be absorbed by gas 2 in the chamber $G_1$ but very little will be absorbed by gas 1 since the radiations capable of being absorbed by this gas have been largely removed by the filter gas 1.

In a similar manner radiations passing through tube E and not absorbed by gas 2 in the filter will be absorbed by gas 1 in the detector. If the two quantities of radiation received by chambers $G_1$, $G_2$ of the detector are not equal an output signal will be obtained from it and after amplification an A.C. signal, which if necessary can be rectified, is available for driving the motor N.

When tubes D and E contain non-absorbing gas, the attenuator T is made to blank off partially the tube A by introducing a shutter V into the path containing tube E and the cam Q is set so that its mid point is in contact with the lever arm L. The cam is directly linked with a pointer W on a recording scale U so that the pointer is on the zero mark when the cam's mid point is in contact with the lever arm. The scale is graduated to read on either side of the zero mark as shown.

If now sample gas is passed into tube D, some radiations are absorbed by component 2 and less energy enters the chamber of the detecting condenser associated with this particular path. To compensate for this the attenuator T is withdrawn automatically as the cam Q rotates in a clockwise direction and the pointer W linked with the cam records the amount of energy absorbed, and consequently the concentration of 2 in one-half of the graduated scale U.

Conversely, if tube D contains non-absorbing gas and sample gas is passed through E, some radiations previously entering the appropriate chamber of the detecting condenser and absorbed by component 1 are eliminated and to balance the increased absorption in E the attenuator blanks off part of the upper radiation path. In this case the cam rotates in an anticlockwise direction and the pointer moves over the other half of the graduated scale U.

I claim:

1. An infra-red analysing apparatus for the analysis of two components of a gas mixture which apparatus comprises two separate absorption paths for infra-red radiation with a sample tube in each path, the sample tube in one path containing the gas mixture under test and the sample tube in the other path containing a gas which does not absorb infra-red radiation in the range of wavelengths absorbed by the gas mixture and detection means having means in one path sensitive to one component gas to be detected and means in the other path sensitive to the other component gas to be detected, the arrangement being such that when sample gas is introduced into one path an electrical signal is produced as a result of the difference in radiant energy falling on detection means which signal is a function of the quantity of one component present, whilst when the sample gas is introduced into the other path an electrical signal opposite in sense to the first said signal is produced, said second signal being a function of the quantity present in the sample of the other component, said apparatus also comprising a servomechanism driven by the said electrical signals, fixed but adjustable means for obscuring a portion of the radiation in at least one of the beam paths to control the energy in the beam path initially, a shutter moveable in and out of one radiation path until the radiations entering the detection means from each path are equalized, means connecting the servo mechanism to the shutter for so moving the shutter, a recorder operable by the said servo mechanism and which indicates the quantity present in the mixture of one or other of the two components, the said recorder having two scales, one for recording the presence of one component, whilst the other scale records the presence of the other component.

2. Infra-red analysing apparatus as claimed in claim 1, wherein said servo mechanism comprises an electric motor and the means connecting the servo mechanism to the shutter comprises a cam driven by the said electric motor and a lever arm actuated by the cam and moving the said shutter.

References Cited in the file of this patent

UNITED STATES PATENTS

| | | |
|---|---|---|
| 2,718,597 | Heigl et al. | Sept. 20, 1955 |
| 2,721,942 | Friel et al. | Oct. 25, 1955 |
| 2,741,703 | Munday | Apr. 10, 1956 |
| 2,844,066 | Friel | July 22, 1958 |
| 2,875,340 | Liston | Feb. 24, 1959 |
| 2,904,686 | Sebens | Sept. 15, 1959 |
| 2,904,687 | Sobcov et al. | Sept. 15, 1959 |